United States Patent [19]

Hoopengardner

[11] Patent Number: 4,797,170
[45] Date of Patent: * Jan. 10, 1989

[54] SYSTEM FOR HOLDING CARPET IN PLACE WITHOUT STRETCHING

[75] Inventor: Merle R. Hoopengardner, Lafayette, Calif.

[73] Assignee: JacTac, Inc., Lafayette, Calif.

[*] Notice: The portion of the term of this patent subsequent to Dec. 10, 2002 has been disclaimed.

[21] Appl. No.: 882,173

[22] Filed: Jul. 7, 1986

[51] Int. Cl.$^4$ .............................................. E04B 2/00
[52] U.S. Cl. ....................................... 156/71; 52/746;
156/90; 156/92; 156/152; 156/249; 156/263;
156/291; 156/313; 156/315; 428/40; 428/317.3;
428/317.7; 428/318.8; 428/352; 428/354;
428/906
[58] Field of Search ................. 156/90, 263, 152, 313,
156/249, 315, 71, 291, 92; 52/746; 428/40, 354,
352, 906, 317.3, 317.7, 318.8

[56] References Cited

U.S. PATENT DOCUMENTS

| | | | |
|---|---|---|---|
| 2,292,024 | 8/1942 | Dreher | 428/354 |
| 4,336,089 | 6/1982 | Asperger | 156/152 |
| 4,550,986 | 11/1985 | Leach | 156/71 |
| 4,557,774 | 12/1985 | Hoopengardner | 156/71 |
| 4,567,091 | 1/1986 | Spector | 428/318.8 |

FOREIGN PATENT DOCUMENTS

926735 5/1963 United Kingdom ............ 428/317.3

Primary Examiner—John J. Gallagher
Attorney, Agent, or Firm—Donald C. Feix; T. M. Freiburger

[57] ABSTRACT

A carpet and pad installation avoids the need for stretching and tackless strips by utilizing a pad with pressure-sensitive adhesive on one surface. The pad is first laid on the floor surface and trimmed as required, with either the adhesive surface down to adhere to the floor, or with the adhesive surface up and another adhesive applied to the floor prior to laying the pad. A removable release film may cover the pressure-sensitive adhesive on the pad, so that with the adhesive side up the carpet may be unrolled over the release film and then cut and seamed as required. The seamed carpet is folded back and the release film is removed from the exposed area of the carpet cushion, then the carpet is pressed down onto the exposed area of adhesive. Then another portion of the carpet is folded back, the release film is removed from that area, and that portion of the carpet is pressed onto the exposed pressure-sensitive adhesive of the carpet cushion. If the adhesive side of the pad is against the floor, a similar procedure is followed, with adhesive being applied to the pad's upper surface after the carpet has been trimmed.

13 Claims, 3 Drawing Sheets

SYSTEM FOR HOLDING CARPET IN PLACE WITHOUT STRETCHING

CROSS REFERENCE TO RELATED UNITED STATES PATENT

This application relates to a system for holding carpet in place without stretching. The system is of the general kind illustrated and described in U.S. Pat. No. 4,557,774 issued Dec. 10, 1985 to Merle R. Hoopengardner (the same inventor as the inventor of this application) and assigned to Jac Tac, Inc. (the same assignee as the assignee of this application).

The system illustrated and described in the patent incorporates a cushion which has a pressure-sensitive adhesive preapplied to both surfaces of the cushion.

The system of the present invention incorporates a cushion which has a pressure-sensitive adhsive preapplied to one surface only of the cushion or padding.

The U.S. Pat. No. 4,557,774 is incorporated by reference in this application in accordance with *The Manual of Patent Examining Procedure*, Section 6.01(p)B.

A copy of U.S. Pat. No. 4,557,774 is also enclosed with this application as filed in the U.S. Patent and Trademark Office.

BACKGROUND OF THE INVENTION

The invention relates to carpet installation and carpet cushion or padding, and more particularly to a system for adhering a pad to the floor and a carpet to the pad, eliminating any need for carpet stretching.

In the prior art, carpeting has been installed on floors in several different ways. In the conventional tackless strip system, the so-called tackless strip is secured to the floor around the walls of the room, the carpet is hooked onto the upwardly protruding nails of the tackless strip at one side of the room, and the carpet is stretched before it is hooked to the tackless strip at the opposite side of the room. One problem with this system is that it requires the installation of the tackless strip, which is time-consuming and which is difficult when concrete floors are encountered. Another problem is that it requires a trained professional to re-stretch the carpet in the event a corner or edge portion of the carpet needs to be temporarily taken up for installation of wiring, access to the floor or for drying a carpet which has been wetted.

Many carpet installations involve gluing of the carpeting to the floor, without any carpet cushion or pad between the carpet and the floor. With such an installation, the carpeting can be of less expensive construction, with a primary backing but without the need for a secondary backing (e.g. a jute backing) which is generally required for stretched carpeting. The glued-down carpeting avoids wrinkling without the need for stretching, but loses the benefit of a carpet pad. Also, the carpet can be very difficult to remove either for replacement or temporarily, for maintenance, without destroying the floor or the carpeting itself due to the adhesion of the glue.

In glue-down installations, the carpet is ordinarily laid on the floor first and seamed as required. The glue is then applied to the floor, either in liquid form or by spraying it onto the floor. This can be accomplished by folding back half of the carpet, applying the glue to the floor in that area, and dropping the carpet in place to adhere it to the floor in that area. The opposite side of the carpet could then be folded back, glue applied to the floor in that area, and that portion of the carpet then adhered to the floor.

Another installation system wherein the carpet was adhered to the floor without padding is disclosed in U.S. Pat. No. 4,405,668. This system used a separate, thin scrim web with adhesive on both sides and with a release film on one side. The scrim web was placed on a floor with the release film on the upper surface, adhering the web to the floor, whereupon the carpet could then be seamed and cut as required while lying on top of the release film. The carpet was then folded back and the release film removed in one area, that portion of the carpet was pressed down, and the operation was repeated in another area. This system was relatively expensive and still did not permit the installation of a carpet pad beneath the carpeting. A similar construction of adhesive webbing material is shown in U.S. Pat. No. 4,234,649.

In yet another system for installing carpet without stretching, a slab or pad of jute material was interposed between the carpet backing and the floor. In this particular system the floor was sprayed with a wet adhesive, the slab of jute material was laid into the adhesive while the adhesive was still wet, the top surface of the jute material was sprayed with the wet adhesive, and the carpet was laid on the wet adhesive on the top surface of the jute slab or pad. The wet adhesive, as it dried, became enough of a pressure sensitive adhesive to permit the carpet to be pulled up and removed.

This system had the disadvantage of being an expensive system because of the costs required to make an on-the-job installation.

As noted above, U.S. Pat. No. 4,557,774 illustrates and discloses a carpet cushion and carpet-laying system similar to that of the present invention, the principal difference being that in the present invention the cushion has a pressure-sensitive adhesive preapplied to only one surface.

SUMMARY OF THE INVENTION

It is a primary object of the present invention to hold carpet in place without stretching by a system that avoids the problems of the prior art.

It is a closely related object to hold the carpet in place by a system that utilizes a pad with pressure sensitive adhesive which is preapplied to one of the surfaces of the pad, with further adhesive applied on the job, to the floor or the upper surface of the pad, depending on which way the pad is used.

By the method of the present invention, carpeting is efficiently and economically installed without stretching or the need for tackless strips, but still with the benefit of a carpet cushion or pad between the floor and the carpet.

First there is positioned on the floor surface a carpet cushion having a pressure-sensitive adhesive on one of its upper and lower surfaces. The preapplied adhesive may be down, against the floor, or up, for contacting and holding the carpet in place, with a release film adhered to the adhesive on the upper surface. If the adhesive side is up, an adhesive may be first applied to the floor, as by troweling or spraying, before the cushion is laid down.

The carpet cushion need not include any significant stiffener, since the adhesion to the floor will provide needed dimensional stability.

When the cushion has been laid and trimmed as required, the carpet is positioned on top of the release film (if the adhesive side is up) on the carpet cushion, and rough cut and seamed as required. The carpet is then folded back to expose a portion of the carpet cushion, usually one half, and the release film is removed from the exposed cushion.

The carpet is then pressed down onto the exposed pressure-sensitive adhesive on the upper surface of the carpet cushion, and another portion of the carpet is folded back and the release film is removed from that area of the carpet cushion. That portion of the carpet is then pressed down.

If the adhesive side of the cushion is down, there is no need for a release film and the carpet can be seamed and rough cut on the cushion's upper surface. Liquid adhesive can be sprayed or troweled on the upper surface by sections, with the carpet folded back as described above.

When all areas of the carpet are in contact with the adhesive, final trimming of the carpet edges is performed.

The described method may include installing rigid spacer strips on the floor along the walls of the room before laying the carpet cushion, preferably strips of wood or plastic with pressure-sensitive adhesive on both sides. The purpose of the spacer strips is to provide an edge similar to that of the tackless strips, since the carpet installer's trimming tools have been designed to trim the carpet with the hard strip present, cutting the carpet ¼ inch long and tucking the carpet edge under, against the wall or baseboard. If a tackless strip from a previous carpet installation is present, it may be left in place with no need for the spacer strips.

In the manufacture of the carpet cushion, sealing means preferably are applied to both surfaces of the pad, which is preferably a foam material, to substantially seal the surface before the pressure-sensitive adhesive is added. This keeps the adhesive at the surface of the foam and prevents wicking-in. The sealing means may comprise a thin plastic skin adhered to each surface at the pad in the manufacturing process. Alternatively, it may comprise a liquid sealant applied to the surfaces, or simply a crust formed at both the lower and upper surfaces of the foam cushion. A crust can be formed by a heat process, or by a curing process wherein increased density occurs at the surfaces. A dense crust can eliminate the need for further sealing at the surfaces of the foam.

The adhesive need not cover the entire surface of the carpet cushion, but may be in spaced strips. Adhesive cost is thereby reduced without adversely affecting the positional stability of the carpet installation. Also, this enables the carpet cushion to be stapled or tacked to the floor, if needed in particular areas, in the spaces between strips of adhesive when the adhesive is on the upper surface. The carpet will then bridge the gap over the recess or dimple caused by the stapling, since there is no adhesive in this area.

The adhesive on the cushion's surfaces may be in parallel serpentine strips to discourage wrinkling of the carpet, which tends to occur in straight lines.

The system of the invention enables the use of less expensive carpeting than usually required in stretch-/tackless strip installations. The typical stretched carpet includes an upper surface yarn, extending through a bonding mesh such as a polypropylene mesh, with a primary backing of latex and a secondary backing of a jute mesh for resiliency in the stretching operation.

With the present system of adhesive bonding of the carpet to the pad and the pad to the floor, the carpet does not need an expensive secondary backing, since it is adhered down in substantially all areas and is not stretched.

It is therefore among the objects of the invention to improve on prior carpeting installation methods and systems by the use of a system including a carpet cushion or pad having pressure-sensitive adhesive on at least one surface, for adhering the cushion to the floor or the carpet to the upper surface of the cushion, with adhesive applied on the job for the other surface, avoiding the need for stretching or for relatively expensive carpeting which includes a secondary backing.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
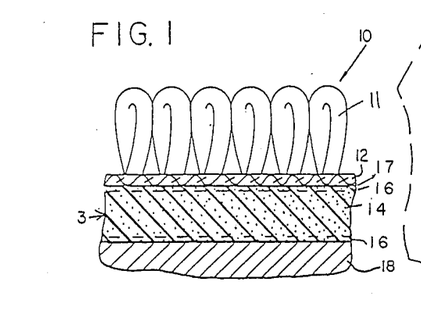
FIG. 1 is a fragmentary sectional view showing a carpet and pad installed according to the system of the invention.

In the drawings, FIG. 1 shows a carpet 10 with a pile 11 and a single backing layer or primary backing 12 laid on a pad or carpet cushion 13 comprising a pad 14 preferably of foam material, with a skin, crust or sealant 16 on both surfaces of the pad and a pressure-sensitive adhesive layer 17 on one of the top and bottom surfaces of the pad 14, applied to the skin, crust or sealant 16. In FIG. 1 the adhesive layer is shown on the upper surface of the pad 13. In this embodiment the adhesive 17 holds the carpet backing 12 to the carpet cushion 13. If the adhesive surface is down, on the other hand, it holds the carpet cushion to the surface of the floor 18 below. Installation steps with repect to these two orientations of the carpet cushion 13 are described further below.

Figure 2:
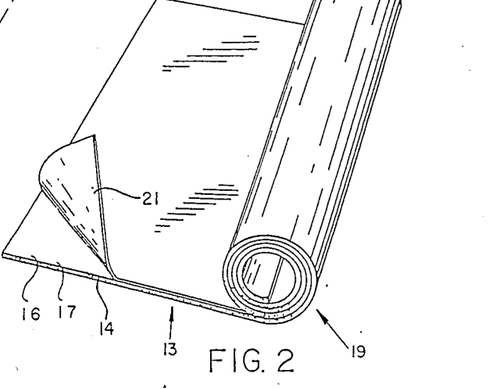
FIG. 2 is a perspective view showing a carpet pad according to the invention and comprising a part of the installation shown in FIG. 1. The pad is shown coming off a roll, with a release film covering one side of the adhesive-coated pad on the inside of the roll, in accordance with one embodiment of the invention.

FIG. 2 shows a roll 19 of the carpet cushion 13 of the invention, showing the foam pad 14 (which may be urethane) and the upper sealed surface 16. The adhesive layer 17 is shown on the upper surface as the cushion 13 will be unrolled, although it can be on the lower surface. A release film 21 of a sheet plastic material is shown overlying the upper surface of the carpet cushion 13, i.e., the inner surface of the cushion on the roll 19, being temporarily adhered to that surface. The bottom of the cushion 13, and thus the outer surface of the roll 19 as seen in FIG. 2, need not be covered by any release film, unless the adhesive side is outside, in which case an outer cover is used until the roll reaches the job site.

The release film (covering the pressure sensitive adhesive on the upper surface of the padding as shown in FIG. 2) enables the cushion to be laid on a floor and adhered to the floor while still leaving the upper surface usable as a work surface for unrolling the carpet 10 and performing preliminary cutting and seaming operations as necessary. For storage and transport of the roll 19 prior to installation, the release film may have a tail or extension 20 (dashed lines) which wraps around the roll and covers the exposed adhesive.

Figure 3:
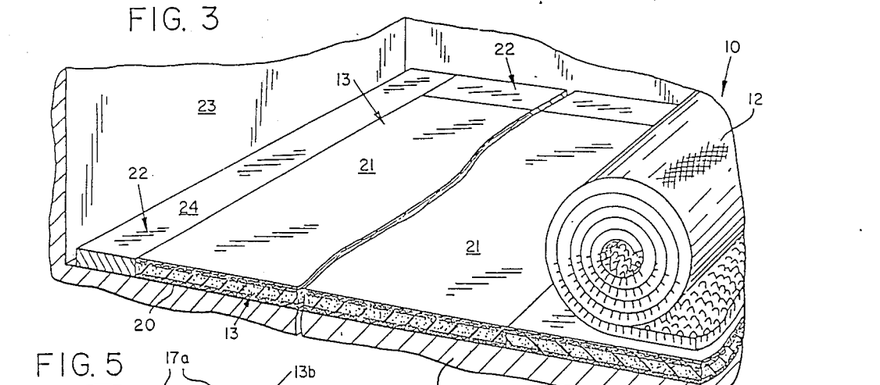
FIG. 3 is a perspective view showing a floor in preparation for carpet installation according to the invention, with the pad laid on the floor and the carpet being unrolled on top of the pad.

FIG. 3 illustrates some aspects of the installation operation according to the system of the invention. First, rigid spacer strips 22 may be installed around the edges of the room near the walls 23. The spacer strips 22 may be of wood or plastic, for example, with a pressure-sensitive adhesive 24 either preapplied onto both the upper and lower surfaces of the strips or applied on the job to both the upper and lower surfaces. The purpose of the strip 24 is merely to take the place of the conventional tackless strips, in the sense that conventional carpeting tools for trimming the finished carpet have been designed to be used along the edges of the tackless strips. If tackless strips are in place from a prior carpet installation, they should be left intact, and the spacer strips 22 would then not be needed.

It should also be understood that the carpet installation according to the invention may be performed without the use of any spacer strips 22 or tackless strips provided the installer uses tools adequate to properly trim the carpet without the presence of the usual rigid strip.

The carpet cushion 13 is unrolled onto the floor along the spacer strips 22, which are of about the same thickness as the cushion, generally in the manner shown in FIG. 2.

FIG. 3 shows the adhesive carpet cushion 13 laid and trimmed on the floor 18, with its lower side adhered to the floor 18.

If the preapplied pressure sensitive adhesive side is up, as illustrated in FIG. 3, a suitable layer of glue (pressure-sensitive adhesive) 20 is applied to the floor surface, as by troweling or spraying before the cushion 13 is unrolled onto the floor.

After the cushion has been laid and trimmed, the release film 21 is left in place on the upper surface as shown in FIG. 3.

The carpet 10 is then unrolled over the top of the release film, and seaming and preliminary cutting are performed as necessary.

Figure 4:
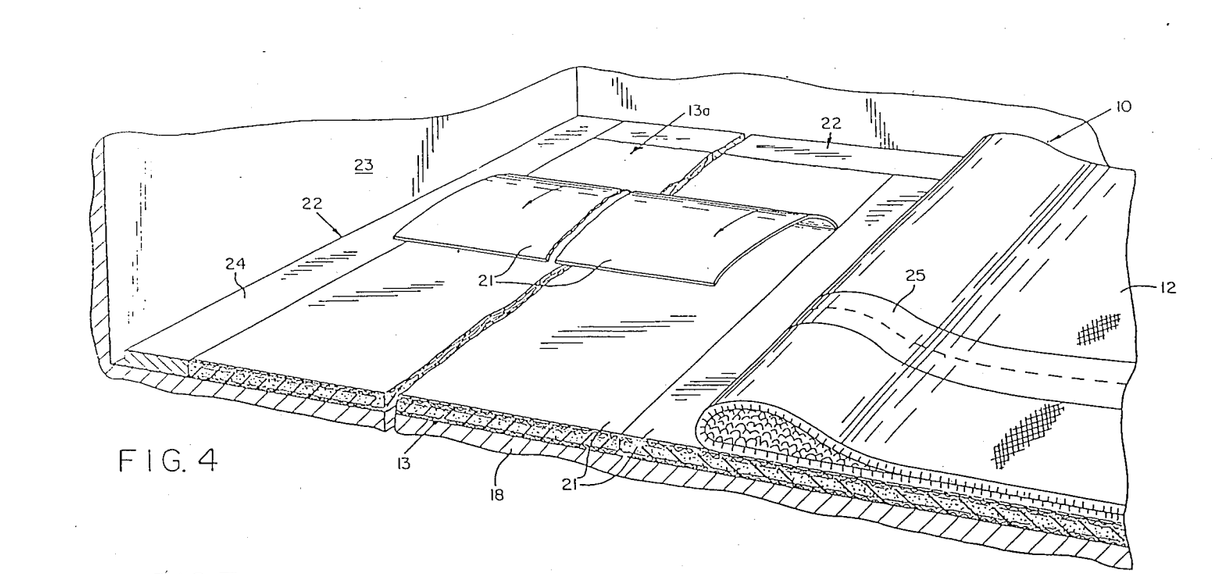
FIG. 4 is a perspective view similar to FIG. 3, but showing the carpet pulled back for peeling away the release film from the top surface of the pad, in a portion of the floor where the carpet, already seamed and cut, has been pulled or rolled back. In this embodiment of the system of the invention the cushion is installed with adhesive side up for contacting the underside of the carpet.
Figure 5:
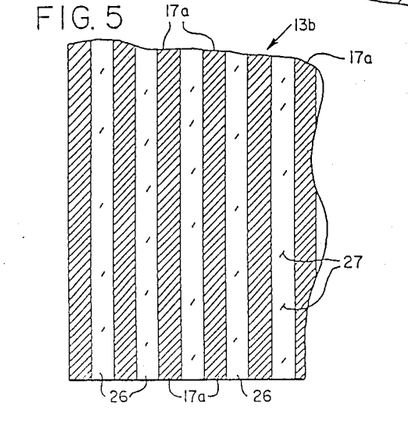

With the carpet seamed (carpet seaming is indicated at 25) and rough cut it is then folded back or rolled back as indicated in FIG. 4 to expose a portion 13a of the cushion. This enables the release film 21 to be peeled off the upper surface of that portion of the cushion 13a as indicated in FIG. 4. Once this is accomplished, the carpet is put back into position on the sticky upper surface of the cushion portion 13a; and the same operation is then repeated with another portion of the carpet 10 which may be the other half of the room. That is, the carpet is pulled or folded or rolled back to expose another portion or the remainder of the carpet cushion and its release film 21 is peeled off. Then the remaining portion of the carpeting is moved back into position, until all areas of the carpet are in contact with the upper surface of the carpet cushion, and final trimming operations are conducted.

Figure 8:
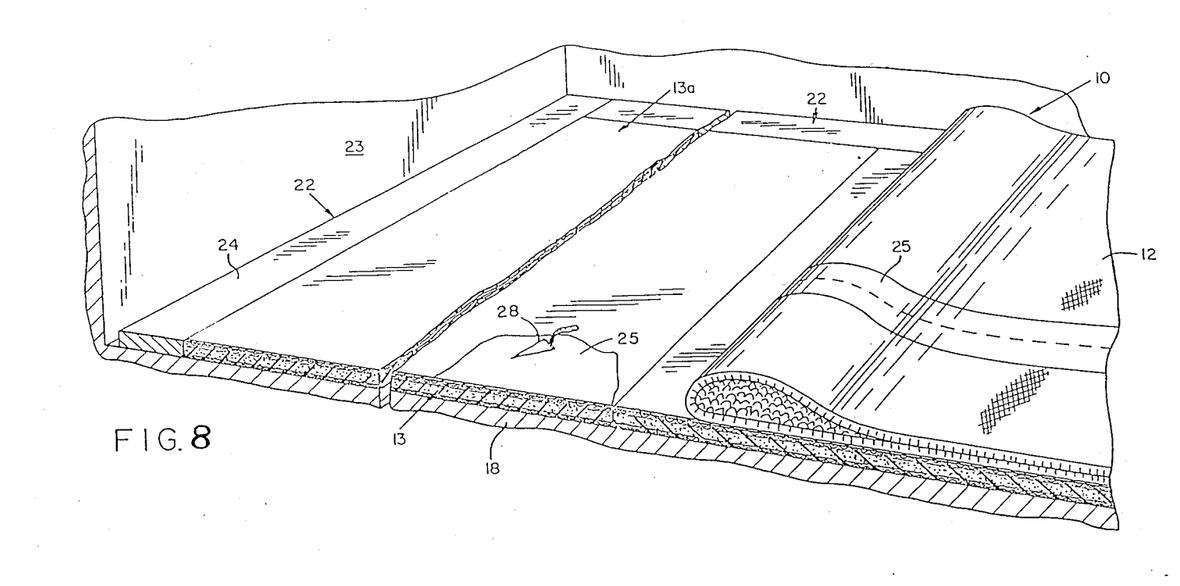
FIG. 8 is a view like FIG. 4 but showing the cushion installed with the adhesive side down. An adhesive is then applied to the upper side of the cushion prior to engaging the carpet back to that side of the cushion. The adhesive is applied by troweling in FIG. 8.

If, on the other hand, the preapplied adhesive surface is laid down against the floor, then a similar operation is performed with respect to pulling back portions of the carpet, but there is no release film 21 to remove since there is no preapplied adhesive on the upper side of the cushion. Therefore, when a section of carpet is pulled back a pressure-sensitive adhesive is applied to the cushion by spraying or troweling. FIG. 8 shows such an adhesive 25 being applied to the upper surface of the cushion using a trowel 28.

Preferably the adhesives used in the carpet cushion and method of the invention are water based, and may comprise an acrylic water based adhesive which loses its tackiness when wetted but regains tackiness upon drying. For example, the adhesive may be the product PS 1000 marketed by A.I.M. Company of Cerritos, Calif. Both the preapplied adhesive and the adhesive added on the job can comprise this type of adhesive. One advantage of this type of adhesive is its ability to regain its tackiness after being over soaked with water. In this sense, the adhesive is non-permanent and allows for temporary lifting of the carpet where desired.

Once the carpet and cushion dry, the adhesive regains its tackiness and the carpet can be pressed into the adhesive.

Figures 3, 5:
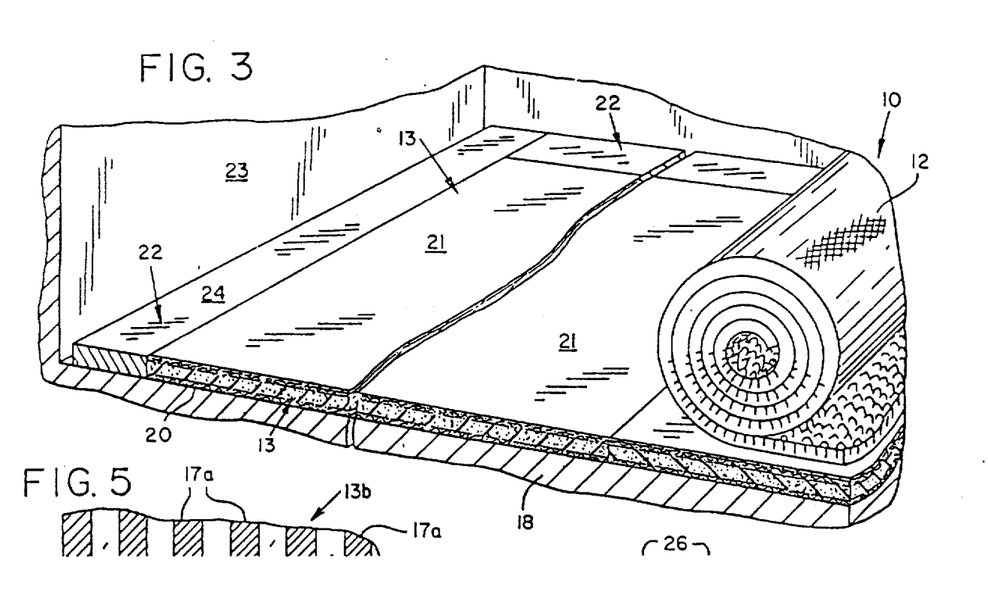
FIG. 5 is a plan view showing a pad according to the invention with its pressure-sensitive adhesive applied in parallel strips rather than over the entire surface of the pad, and showing optional stapling between the strips of adhesive.

FIG. 5 shows a carpet cushion 13b according to the invention, with spaced strips of adhesive 17a upon the surface, separated by spaces 26 on the surface which have no adhesive. This saves on the amount of adhesive required while still providing for adequate adhesion of the carpet cushion 13b to the floor or the carpet backing. Also, when the adhesive is up, it enables staples 27 or tacks to be used to hold the carpet cushion 13b down to the floor if required under special circumstances, without causing the carpet to recess or "dimple" inwardly at the location of the staple. Dimpling is avoided because there is no adhesive in the immediate vicinity of each staple 27, so the carpet does not adhere into the recess in the cushion caused by the staple, but rather the carpet bridges across the recess.

Figure 6:
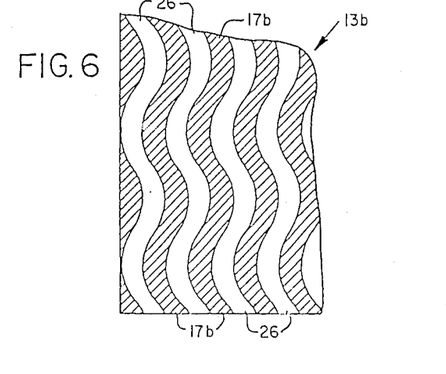
FIG. 6 is a plan view similar to FIG. 4, but showing the adhesive applied in serpentine strips.

FIG. 6 shows a serpentine pattern for adhesive strips 17b on a carpet cushion 13b, which may be desired to prevent a pattern of wrinkling in the installed carpet. Wrinkles tend to occur in straight lines, so that the serpentine pattern shown in FIG. 6 discourages the occurence of wrinkles.

Figure 7:
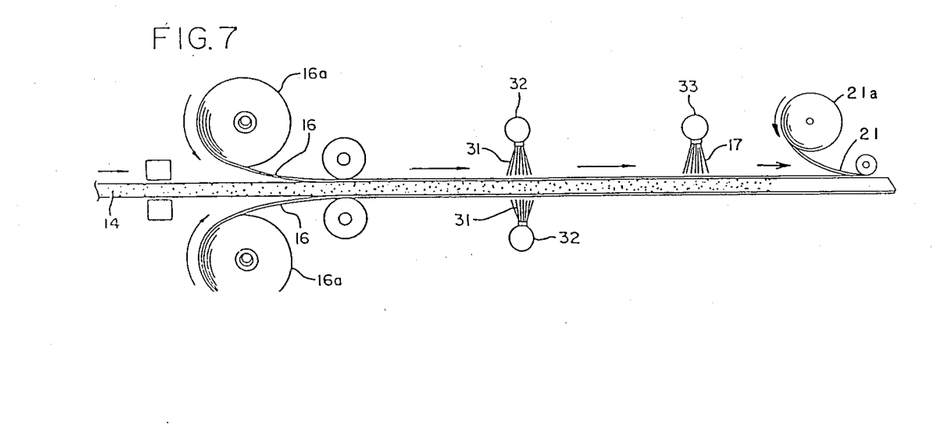
FIG. 7 is a schematic view indicating a method for producing the carpet pad of the invention.

As indicated in FIG. 7, in the manufacture of the adhesive carpet cushion 13, a very thin plastic film or skin may be bonded to or formed on both sides of the foam sheet 14 in the manufacturing process, to form the sealing surface 16 described above. The skin 16 may be bonded to the surfaces of the pad 14 by a heat bonding process, so that it is fused into the surfaces of the foam pad during the manufacturing process, or it may be bonded by other suitable means such as adhesives. A skin or crust may be formed (as an integral part of the cushion) as part of the forming process of manufacturing a foamed cushion. Alternatively, a sealant 31 may be applied in lieu of the plastic skin, or integral crust, as by liquid application or spraying by spray nozzles 32 on both surfaces of the pad. In either event, the surfaces are sealed to substantially close the porosity of the foam at the surfaces.

Next, an adhesive 17 such as hot melt adhesive is applied to at least one surface, as by sprayers 33, and the adhesive does not penetrate into the foam due to the prior application of the sealing means.

As mentioned above, the sealing means may alternatively comprise a crust of substantially increased density in the surfaces of the foam pad, formed by heat, the manner of curing of the foam, or other suitable means.

The release film 21 may next be applied to one side of the carpet cushion 13, temporarily bonding to the adhesive on that side. Preferably, all of these operations are accomplished in a continuous process wherein the foam 14, scrim webbing 16 and release film 21 are advanced off roll stock 16a and 21a as schematically indicated in FIG. 7. The sealant and adhesive are applied at appropriate points in the operation, and the final product emerges complete and is stored in rolls 19 similar to that shown in FIG. 2.

The cushion or padding 13 can also be made from materials other than integrally formed foam. For example the cushion may be made from rebonded urethane or felted and needle punched synthetic with sealed surfaces on the top and bottom.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of installing a carpet with a carpet cushion, comprising:
    applying an adhesive to a floor surface;
    positioning a carpet cushion on the floor surface to adhere it thereto and trimming as required, said carpet cushion having a preapplied pressure-sensitive adhesive on its upper surface and a removable release film on the pressure-sensitive adhesive;
    positioning the carpet on top of the release film on the carpet cushion and cutting and seaming the carpet as required;
    folding back the carpet and removing the release film from the exposed area of the carpet cushion;
    pressing the carpet down onto the exposed pressure-sensitive adhesive on the upper surface of the carpet cushion;
    folding back another portion of the carpet and removing the release film from that area and then pressing that portion of the carpet onto the exposed pressure-sensitive adhesive of the carpet cushion; and
    performing final trimming at the carpet edges as required when the entire carpet has contacted the adhesive.

2. The invention defined in claim 1 including installing rigid spacer strips on the floor along the walls of the room prior to laying the carpet cushion.

3. The invention defined in claim 1 wherein the pressure-sensitive adhesive is in spaced strips on the upper surface of the carpet cushion.

4. The invention defined in claim 3, further including stapling the carpet cushion to the floor as needed prior to positioning the carpet on the release film of the carpet cushion, the stapling being done between the spaced strips of adhesive on the upper surface of the carpet cushion so that dimples formed in the carpet cushion at the stapling will occur in areas devoid of adhesive, whereby the carpet will span the dimples without adhering into them.

5. The invention defined in claim 3, wherein the spaced strips are in a serpentine configuration.

6. The invention defined in claim 1, wherein the cushion comprises a urethane foam, and includes sealing means for sealing both surfaces, to receive adhesive and prevent the adhesive from wicking into the foam.

7. The invention defined in claim 6, wherein the sealing means comprises a thin plastic film or skin adhered to each surface of the cushion.

8. The invention defined in claim 1, wherein the preapplied pressure-sensitive adhesive is a water based adhesive, and further including the step of applying water to the pressure-sensitive adhesive to cause it to lose tackiness prior to laying the carpet on the cushion, then laying the carpet and working out all wrinkles in the carpet with the adhesive wetted, then allowing the pressure-sensitive adhesive to dry and resume its tackiness, and pressing the carpet down to adhere it to the carpet cushion.

9. A method of installing a carpet with a carpet cushion, comprising:
    positioning a carpet cushion on a floor surface and trimming as required, said carpet cushion having a pressure-sensitive adhesive on its lower surface to adhere it to the floor;
    positioning the carpet on the upper surface of the carpet cushion and cutting and seaming the carpet as required:
    folding back the carpet and applying an adhesive to the exposed area of the carpet cushion;
    pressing the carpet down onto the adhesive on the exposed area of the upper surface of the carpet cushion to adhere it thereto;
    folding back another portion of the carpet and applying adhesive to that area and then pressing that portion of the carpet onto the adhesive to bond it to the carpet cushion; and
    performing the final trimming at the carpet edges as required when the entire carpet has been adhered to the carpet cushion.

10. The invention defined in claim 9, wherein the cushion comprises a urethane foam, and includes sealing means for sealing both surfaces, to receive adhesive and prevent the adhesive foam wicking into the foam.

11. The invention defined in claim 10, wherein the sealing means comprises a thin plastic film or skin adhered to each surface of the cushion.

12. A carpet and pad installation, retained in place on a floor surface by adhesion, without need for stretching, comprising:

a carpet cushion in contact with the floor surface, the cushion being of such thickness, density and compressibility as to enable it to serve as a carpet cushion, with pressure-sensitive adhesive bonding the lower surface of the carpet cushion to the floor surface, and with pressure-sensitive adhesive on the upper surface of the carpet cushion;

a carpet laid on the upper surface of the carpet cushion and bonded thereto by the pressure-sensitive adhesive, and said adhesives being non-permanent and allowing for temporary lifting of the carpet wholly or in localized areas when desired.

13. The invention defined in claim 12, wherein the carpet has a primary backing as its only backing.

* * * * *

REEXAMINATION CERTIFICATE (1471st)
United States Patent [19]
Hoopengardner

[11] B1 4,797,170
[45] Certificate Issued  May 21, 1991

[54] SYSTEM FOR HOLDING CARPET IN PLACE WITHOUT STRETCHING

[75] Inventor: Merle R. Hoopengardner, Lafayette, Calif.

[73] Assignee: JacTac Inc, Lafayette, Calif.

Reexamination Request:
No. 90/001,837, Sep. 6, 1989

Reexamination Certificate for:
Patent No.: 4,797,170
Issued: Jan. 10, 1989
Appl. No.: 882,173
Filed: Jul. 7, 1986

[51] Int. Cl.$^5$ ............................................. E04B 2/00
[52] U.S. Cl. ........................................ 156/71; 52/746;
156/90; 156/92; 156/152; 156/249; 156/263;
156/291; 156/313; 156/315; 428/40; 428/317.3;
428/317.7; 428/318.8; 428/352; 428/354;
428/906
[58] Field of Search ................. 52/746; 156/71, 263,
156/90, 291, 92, 313, 249, 152, 315; 428/40,
354, 352, 906, 317.3, 317.7, 318.8

[56] References Cited
U.S. PATENT DOCUMENTS

| | | | |
|---|---|---|---|
| 3,847,647 | 11/1974 | Bahlo | 156/277 |
| 3,871,948 | 3/1975 | Norris . | |
| 4,075,377 | 2/1978 | Aitchison et al. | 428/95 |
| 4,100,006 | 7/1978 | Buckley | 156/78 |
| 4,522,857 | 6/1985 | Higgins . | |
| 4,647,484 | 3/1987 | Higgins . | |

FOREIGN PATENT DOCUMENTS 7124118  6/1971  Fed. Rep. of Germany .
1416684  11/1972  United Kingdom .

*Primary Examiner*—John J. Gallagher

[57] ABSTRACT

A carpet and pad installation avoids the need for stretching and tackless strips by utilizing a pad with pressure-sensitive adhesive on one surface. The pad is first laid on the floor surface and trimmed as required, with either the adhesive surface down to adhere to the floor, or with the adhesive surface up and another adhesive applied to the floor prior to laying the pad. A removable release film may cover the pressure-sensitive adhesive on the pad, so that with the adhesive side up the carpet may be unrolled over the release film and then cut and seamed as required. The seamed carpet is folded back and the release film is removed from the exposed area of the carpet cushion, then the carpet is pressed down onto the exposed area of adhesive. Then another portion of the carpet is folded back, the release film is removed from that area, and that portion of the carpet is pressed onto the exposed pressure-sensitive adhesive of the carpet cushion. If the adhesive side of the pad is against the floor, a similar procedure is followed, with adhesive being applied to the pad's upper surface after the carpet has been trimmed.

FIG. 3

FIG. 5

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 42–44:

It is a primary object of the present invention to hold *wall-to-wall* carpet in place without stretching by a system that avoids the problems of the prior art.

Column 2, lines 51–55:

By the method of the present invention, *wall-to-wall* carpeting is efficiently and economically installed without stretching or the need for tackless strips, but still with the benefit of a carpet cushion or pad between the floor and the carpet.

Column 5, lines 43–58:

FIG. 3 illustrates some aspects of the installation operation according to the wall-*to-wall carpet installing* system of the invention. First, rigid spacer strips 22 may be installed around the edges of the room near the walls 23. The spacer strips 22 may be of wood or plastic, for example, with a pressure-sensitive adhesive 24 either preapplied onto both the upper and lower surfaces of the strips or applied on the job to both the upper and lower surfaces. The purpose of the strip 24 is merely to take the place of the conventional tackless strips, in the sense that conventional carpeting tools for trimming the finished carpet have been designed to be used along the edges of the tackless strips. If tackless strips are in place from a prior carpet installation, they should be left intact, and the spacer strips 22 would then not be needed.

AS A RESULT OF REEXAMINATION IT HAS BEEN DETERMINED THAT:

The patentability of claims 1–11 is confirmed.

Claims 12–13 are cancelled.

\* \* \* \* \*